US008763232B2

(12) United States Patent
Richter et al.

(10) Patent No.: US 8,763,232 B2
(45) Date of Patent: Jul. 1, 2014

(54) APPARATUS AND METHOD FOR INSERTING DUAL WEATHERSTRIPS HAVING OPPOSED SEALING ELEMENTS INTO A FRAME MEMBER

(75) Inventors: Daniel W. Richter, Farmington, NY (US); Yogesh Borkar, Rochester, NY (US)

(73) Assignee: Ultrafab, Inc., Farmington, NY (US)

( * ) Notice: Subject to any disclaimer, the term of this patent is extended or adjusted under 35 U.S.C. 154(b) by 0 days.

(21) Appl. No.: 13/443,227

(22) Filed: Apr. 10, 2012

(65) Prior Publication Data
US 2012/0266440 A1 Oct. 25, 2012

Related U.S. Application Data

(62) Division of application No. 12/085,208, filed as application No. PCT/US2005/042585 on Nov. 23, 2005, now Pat. No. 8,161,624.

(51) Int. Cl.
*B23P 19/02* (2006.01)

(52) U.S. Cl.
USPC .............. 29/451; 29/235; 29/248; 29/33 S

(58) Field of Classification Search
USPC .............. 29/248, 235, 451, 564.8, 33 S, 33 K
See application file for complete search history.

(56) References Cited

U.S. PATENT DOCUMENTS

| 3,335,487 | A | * | 8/1967 | Ellenberg et al. | 29/235 |
| 3,456,410 | A | * | 7/1969 | Johnson et al. | 52/309.1 |
| 4,148,953 | A | * | 4/1979 | Horton | 428/85 |
| 4,172,313 | A | * | 10/1979 | Takahashi | 29/235 |
| 4,302,494 | A | * | 11/1981 | Horton | 428/95 |
| 4,377,893 | A | * | 3/1983 | Buonanno | 29/417 |
| 4,528,736 | A | * | 7/1985 | Hope et al. | 29/235 |
| 5,103,547 | A | * | 4/1992 | Holloway et al. | 29/451 |
| 5,338,382 | A | * | 8/1994 | Johnson et al. | 156/72 |
| 5,758,400 | A | * | 6/1998 | Miller et al. | 29/451 |
| 5,940,950 | A | * | 8/1999 | Galat | 29/235 |
| 5,979,036 | A | * | 11/1999 | Socci et al. | 29/451 |
| 6,385,833 | B1 | * | 5/2002 | Albanese et al. | 29/235 |
| 6,622,362 | B1 | * | 9/2003 | Scharmann et al. | 29/235 |
| 6,736,921 | B1 | * | 5/2004 | Saward et al. | 156/244.22 |
| 8,161,624 | B2 | * | 4/2012 | Richter et al. | 29/564.8 |
| 8,181,624 | B2 | * | 5/2012 | Van Blaricom | 123/237 |

* cited by examiner

*Primary Examiner* — David Bryant
*Assistant Examiner* — Jacob Cigna
(74) *Attorney, Agent, or Firm* — Kenneth J. Lukacher Law Group

(57) ABSTRACT

Weatherstrips (13, 15) having opposed pile sealing elements (226) are installed in opposed slots in a frame member (14) so that the piles may engage opposite sides of a panel, shutter or screen (203), by insertion apparatus having laterally-movable slotted guides (60, 62). The weatherstrips are driven through the slots in the guides by a drive wheel (42). A laterally reciprocating cutter (48) has openings (107, 109), through which the weatherstrips are driven, and shearing edges (98) for cutting ends of the weatherstrips to facilitate entry of the weatherstrips from the slots in the guide into the slots in the frame member. Metering wheel (44) engages at least one of the weatherstrips moving through the guides, and provides for actuation of the cutter, when the desired length of the weatherstrips is driven through the guides; the length corresponding to the length of the frame member which receives the weatherstrips.

3 Claims, 16 Drawing Sheets

APPARATUS AND METHOD FOR INSERTING DUAL WEATHERSTRIPS HAVING OPPOSED SEALING ELEMENTS INTO A FRAME MEMBER

This is a divisional application from U.S. patent application Ser. No. 12/085,208, filed May 19,2008, now U.S. Pat. No. 8,161,624, issued Apr. 24, 2012, which is a national phase filing of International Application No. PCT/US2005/042585, filed Nov. 23, 2005, the entire contents of which are incorporated herein by reference.

The present invention relates to an apparatus and method for inserting weatherstrips into frame members, and particularly to an apparatus and method for inserting a pair of weatherstrips in opposed relationship within a frame member having opposite walls with slots into which the backing strips of the weatherstrips are inserted simultaneously to effect a sealing path between opposed ends of the sealing elements, such as the piles or brushes, of the weatherstrips.

The present invention provides a dual weatherstrip insertion machine for insertion of weatherstrips into a frame member, such as provided by a U-shaped extrusion having slots for receiving the weatherstrips on the insides of opposed walls of the frame member; the weatherstrips presenting sealing elements, such as piles, which may be at an acute angle to a perpendicular between the backing strips of the weatherstrips. The sealing path is along the intersection of the piles.

A screen, shutter, panel or other closure may be movable with respect to a sealing path formed by the opposed sealing elements which engages opposite sides of the panel, shutter, screen or other movable closure, as it moves along the sealing path.

FIGS. 1 and 2 show a roller screen, which is an example of the application of dual weatherstrips 200 and 202 which may be inserted into extrusions 214 and 216 through the use of an insertion machine provided by this invention. The weatherstrips form longitudinal intersections 204 and 206 between the opposed weatherstrips 200 and 202, thereby providing lines along which the screen 203 is movable where opposite sides of the screen are sealed at the intersections. In FIGS. 1 and 2, the screen 203 winds and unwinds on a spring roller 201 captured in a screen track 210 movable in the directions shown by the arrows 211. The track 210 and screen 203 are in a frame provided by the pair of extrusions 214 and 216. These extrusions have walls and along the inside surfaces of the walls are slots 220 and 222 which receive the backing strips 224 of the weatherstrips 226 of the kind described in Horton U.S. Pat. No. 4,302,494, issued Nov. 24, 1981, and U.S. Pat. No. 4,148,953, issued Apr. 1, 1979, or Johnson et al. U.S. Pat. No. 5,338,382, issued Aug. 16, 1994, except that the pile 228 extending from the backing strips is at an angle to a perpendicular to the backing strip of from 15 to 60 degrees. The angle facilitates the insertion of the screen 203 between the opposed weatherstrips for engagement with the piles extending therefrom towards the sealing line. In the roller screen application, the walls of the extrusion and the slots therein are closely spaced, and the weatherstrips are usually inserted manually into the extrusions. Because of the close spacing of the slots in the extrusion, insertion with devices for inserting or staking the weatherstrips into the slots, or pulling the weatherstrip through slots are not practicable. Such insertion devices are shown, for example in U.S. Pat. No. 6,385,833 to Albanese et al., issued May 14, 2002, U.S. Pat. No. 5,979,036 to Socci et al., issued Nov. 9, 1999, U.S. Pat. No. 6,736,921 to Saward et al., issued May 18, 2004, and U.S. Pat. No. 5,758,400 to Miller et al., issued Jun. 2, 1998.

Accordingly, it is the principal object of the present invention to provide an improved apparatus for the dual insertion of weatherstrips, at the same time, into extrusions and other frame members, having slots spaced to receive the weatherstrips, so that when received their piles or other sealing elements form a sealing path along which a closure element, such as a screen, panel, door, or window, may be received in sealing engagement with the sealing element or pile on opposite sides thereof.

The present invention enables dual insertion of piles which are in such closely spaced relationship that the ends of their sealing elements, as may be provided by ends of the brushes or piles, are closely spaced or in engagement to provide the sealing path there between along which a closure may be sealed on opposite sides thereof.

The invention also provides an apparatus for insertion of metered lengths of the dual weatherstrips, such that the weatherstrips are inserted and cut to length suitable for the extrusion or other frame member in which they are installed by the insertion apparatus.

The invention also eliminates the need for insertion and staking wheels which drive the backings of weatherstrips into slots and the need for pulling weatherstrips through slots; the alignment of fresh weatherstrip and the advancement thereof into the extrusion or other frame member being implementable with minimum operator or other manual or skilled effort.

Briefly described, the invention provides an apparatus for dual insertion of weatherstrips into a frame member. The frame member may be provided by an extrusion having slots which receive the weatherstrips, with the ends of their sealing elements (piles or brushes in case of pile weatherstrips) in opposed relationship, so as to provide a sealing path along which opposite sides of a closure element (a screen, panel, window, shutter, for example) may be disposed. The apparatus has a pair of guide members, or guides, having slots through which the weatherstrips may be advanced while being disposed in the same relationship as required for the weatherstrips in the slots of the extrusion; specifically with the backing strips generally parallel to each other and the pile extending outwardly from the backing strips towards each other to define the sealing path therebetween. At least one of the guides is laterally movable so that the slots therein are positioned in alignment with the weatherstrip receiving slots of the extrusion. The extrusion may be butted against an outlet end of the guides, as with the aid of an alignment fixture. The weatherstrips are driven out from the guides into the slots of the extrusion by a drive wheel which engages edges of the dual weatherstrips while they are supported in the guides. Pressure may be provided on the opposite edges of the weatherstrips by a pressure roller. A cutter having shearing edges is laterally reciprocal in the guides across the path of the weatherstrips, which pass through the cutter. When a desired length of dual weatherstrips is driven out of the guide members into the extrusion, which length may be measured by a wheel engageable with at least one of the weatherstrips, the cutter is actuated. Dart shaped ends may be sheared at the end of the measured lengths of weatherstrip so as to facilitate insertion thereof from the slots in the guide members into the corresponding slots in the extrusion.

The invention also provides a method for inserting a pair of weatherstrips having the steps of providing a pair of guide slots in which each base of said weatherstrips is capable of traveling along one of the guide slots, aligning the guide slots with the slots of the fixture, driving simultaneously along the guide slots the base of each of the weatherstrips into the slots of the fixture with the aid of a motor driven wheel engaging the base of each of the weatherstrips, and cutting the weatherstrips when the weatherstrips are inserted in the fixture.

The foregoing and other objects, features and advantages of the invention, as well as a presently preferred embodiment of dual insertion apparatus according to the invention, will become more apparent from a reading of the following description in connection with the accompanying drawings in which.

Figure 10:
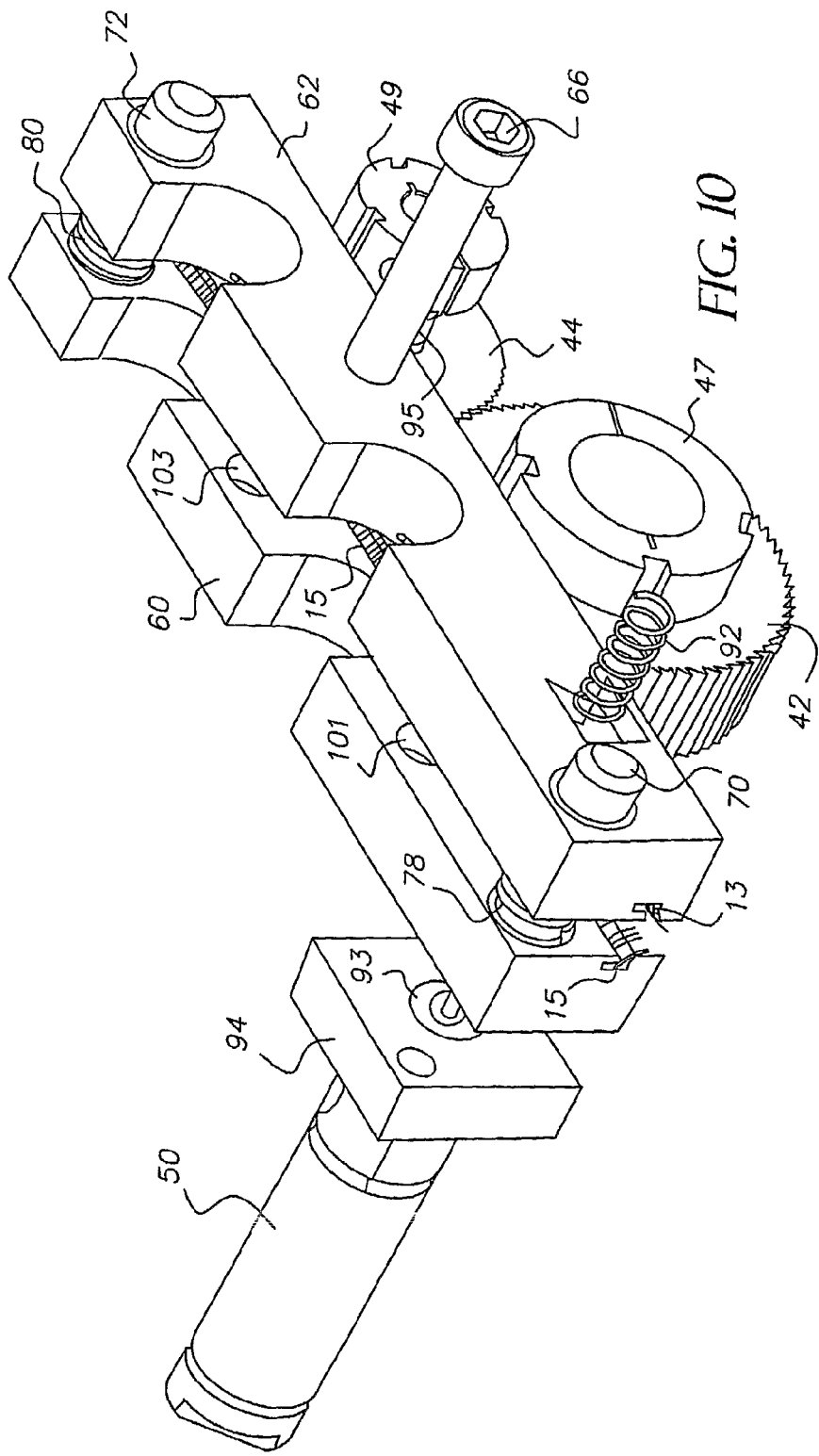
FIG. 10 is a perspective view showing an assembly of the principal parts of the apparatus shown in the preceding figures with dual pile weatherstrips inserted into the slots of the guides in the apparatus.
Figure 10A:
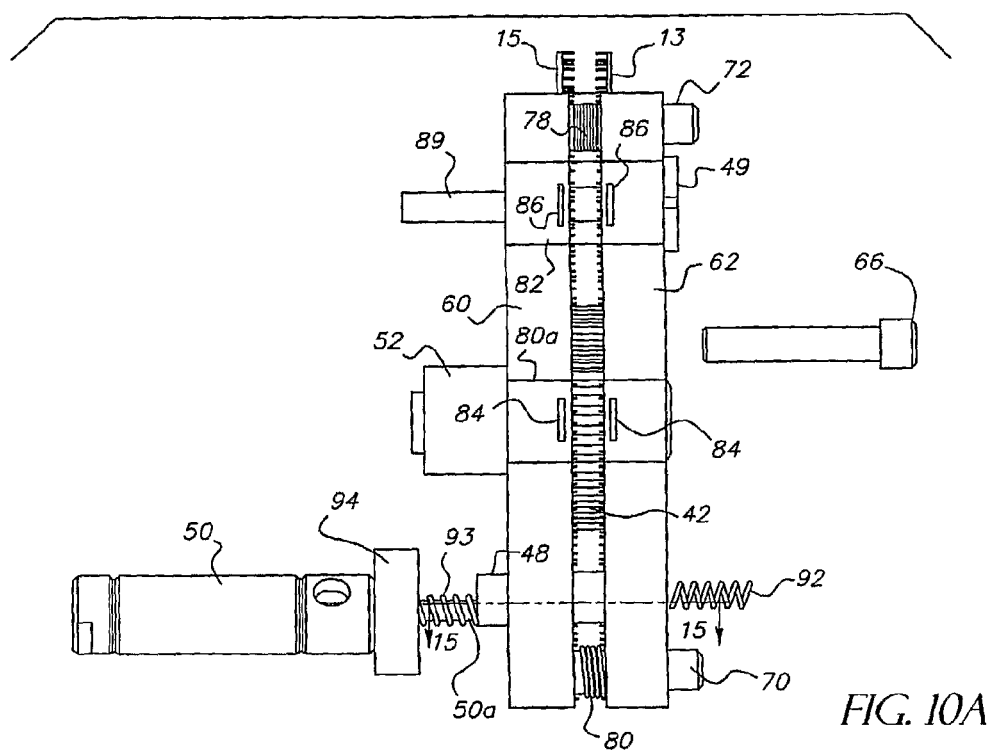
FIG. 10A is a plan view of the assembly as shown in FIG. 10.
Figure 13:
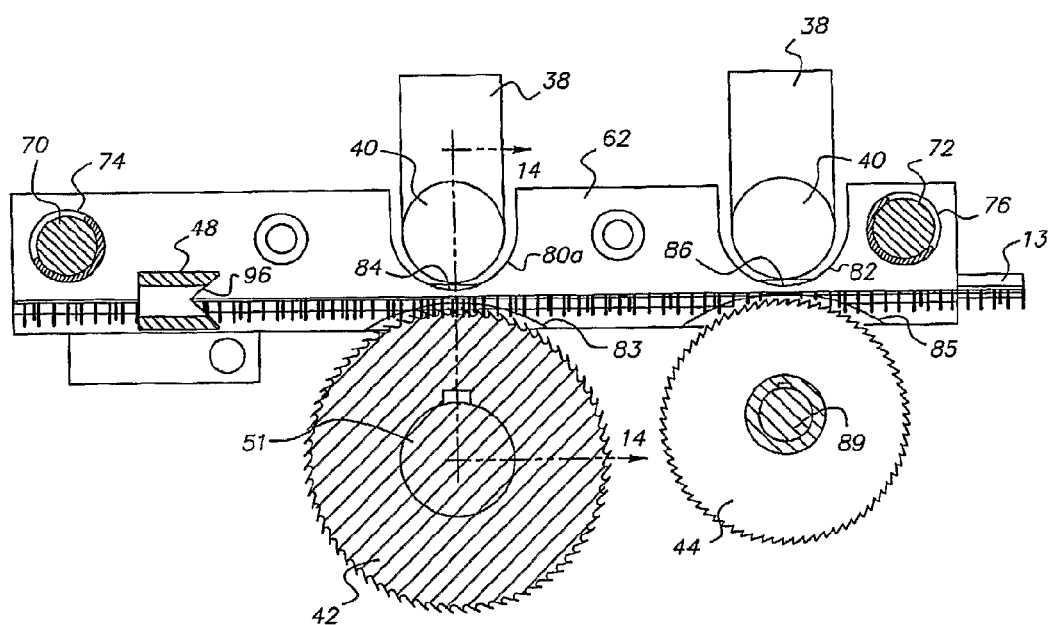
FIG. 13 is a sectional view of the assembly shown in FIGS. 10 to 12, the section being taken along the line 13-13 in FIG. 12.
Figure 14:
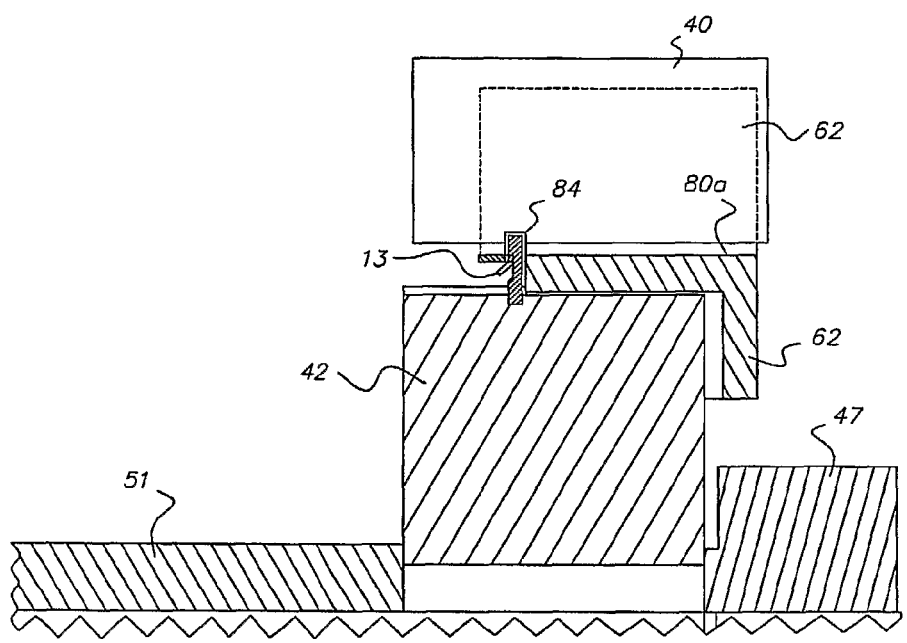
Figure 15:
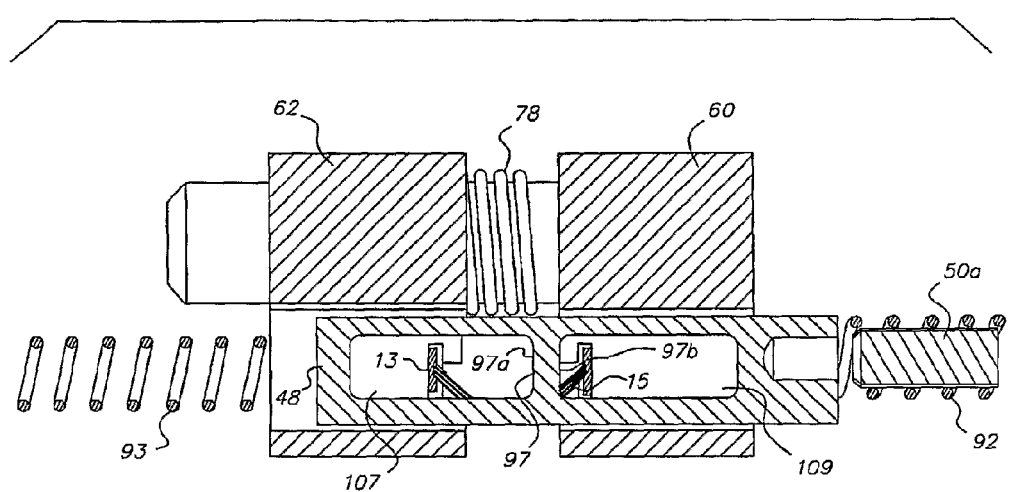

FIG. 14 is a fragmentary, sectional view showing the opposed drive wheel and pressure roller in engagement with opposite edges of the backing strips of the weatherstrips shown in the assembly illustrated in FIGS. 10-13, the section being taken along the line 14-14 in FIG. 13; and FIG. 15 is a fragmentary, sectional view taken along the line 15-15 in FIG. 10A which illustrates the cutter for cutting the dual weatherstrips, positioned in the center of its travel laterally of the guides of the insertion apparatus.

Figure 1:
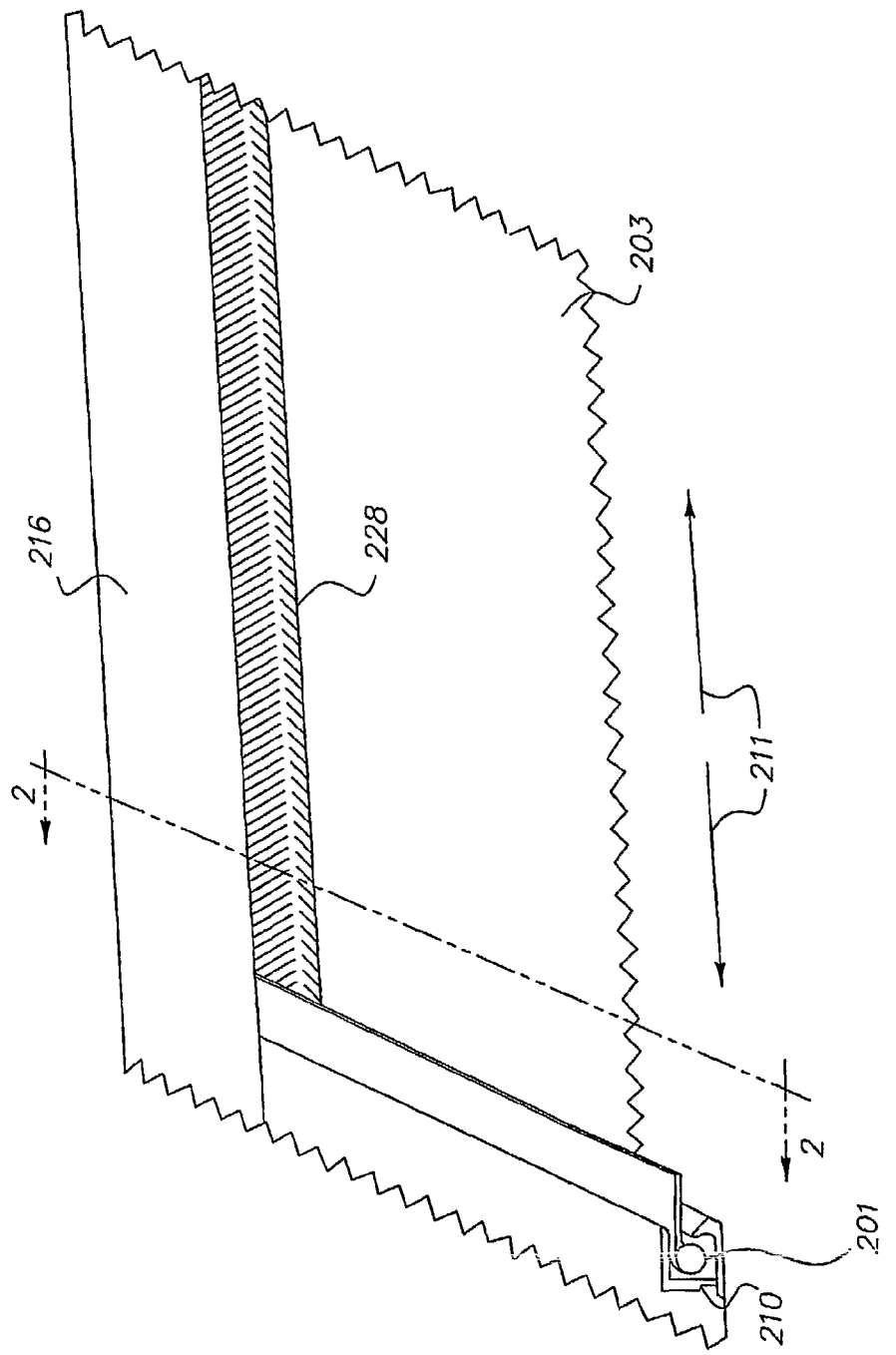
FIGS. 1 and 2 are fragmentary, elevational and sectional views (FIG. 2 being taken along the line 2-2 in FIG. 1) which illustrate the roller screen application of dual weatherstrips described above, which may be inserted using insertion apparatus provided by the present invention.
Figure 2:
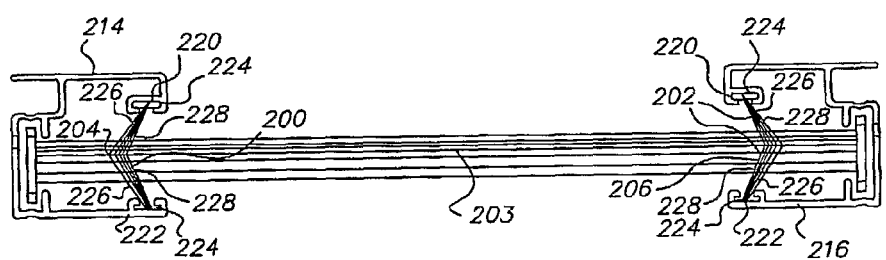
Figure 3:
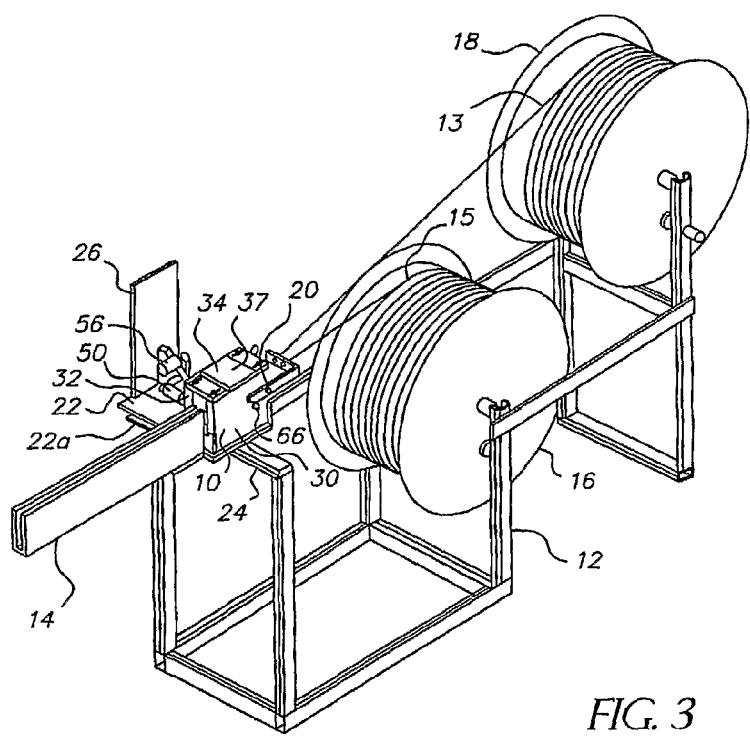
FIG. 3 is a perspective view illustrating the dual weatherstrip insertion apparatus provided in accordance with the presently preferred embodiment of the invention.
Figure 4:
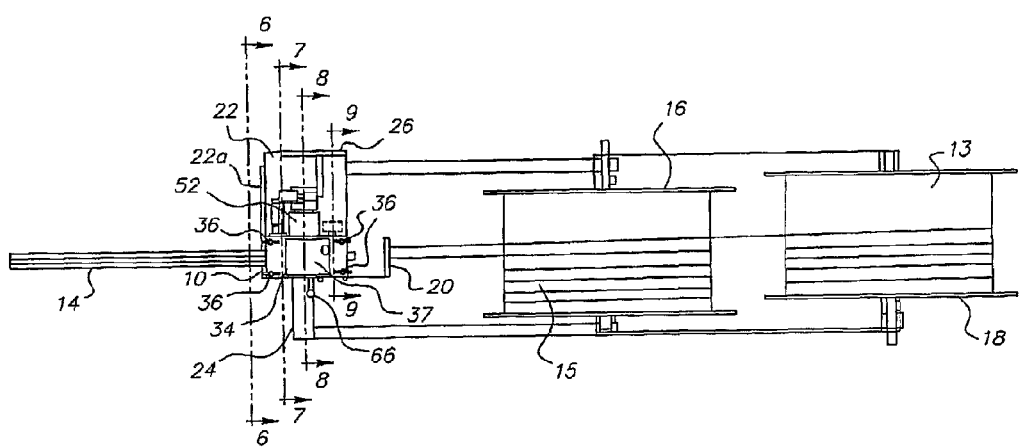
FIG. 4 is a plan view of the apparatus shown in FIG. 3.

Referring more particularly to the drawings, there shown, in FIGS. 3 and 4, the insertion apparatus provided by the invention. A housing 10 on a framework 12 contains the insertion apparatus. The extrusion 14 is shown placed against the output end of the apparatus ready to receive or in process of receiving the dual weatherstrips 13 and 15. A fixture may be used to effect support and alignment of various types of extrusion 14 at the outlet end, as discussed below. The weatherstrips 13 and 15 are payed off reels 16 and 18, and guided by a bracket 20 into the inlet end of the apparatus. A base plate 22 is mounted on a forward horizontal strut 24 of the framework 12. This strut and the rest of the framework 12 are omitted in FIG. 5 and in the other drawings after FIG. 5. A back plate 26 mounts compressed air lines and control valves and also electrical components for operating the valves, which are not shown in the drawing. An edge 22a of the base plate 22 may be provided to assist the operator in seating the extrusion 14 up against the housing 10 in position to have the weatherstrips inserted therein.

Figure 5:
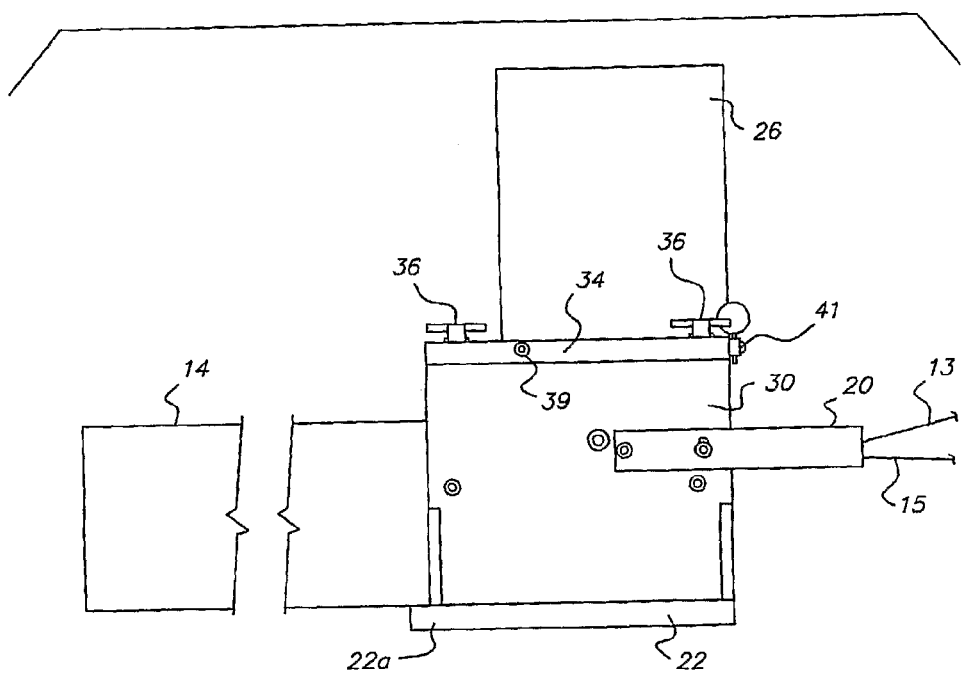
FIG. 5 is a side view of the insertion apparatus shown in FIGS. 3 and 4, the framework supporting the apparatus which is shown in FIGS. 3 and 4, and the reels for the weatherstrip being omitted in FIG. 5.
Figure 6:
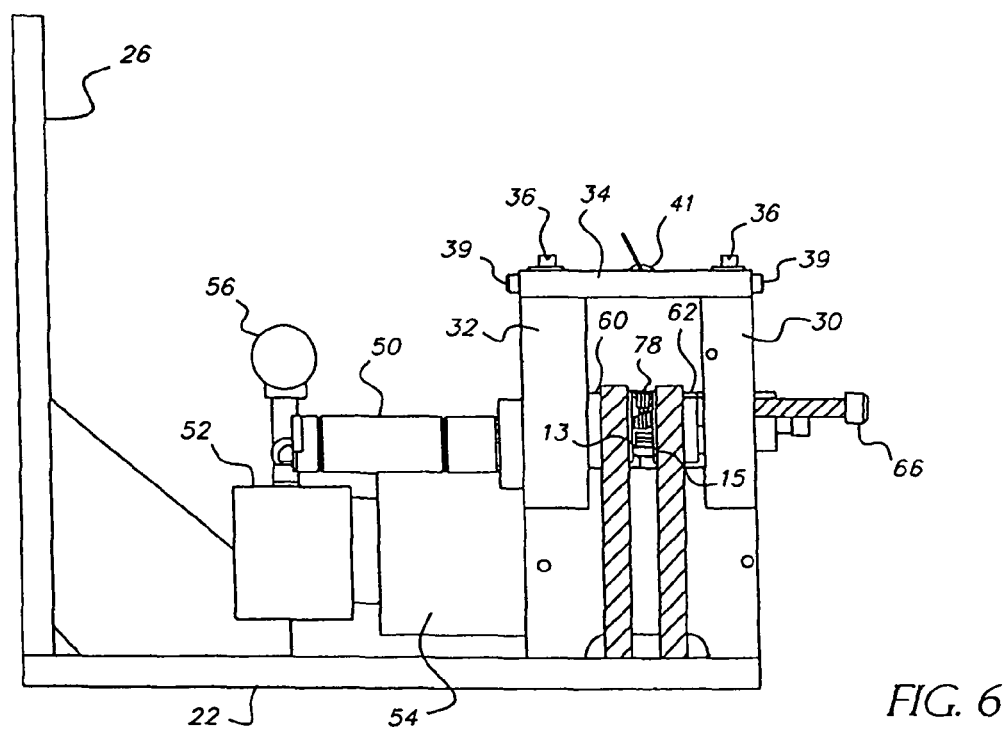
FIG. 6 is an end view, from the outlet end, of the apparatus shown in FIG. 5, the view taken along the line 6-6 in FIG. 4.
Figure 7:
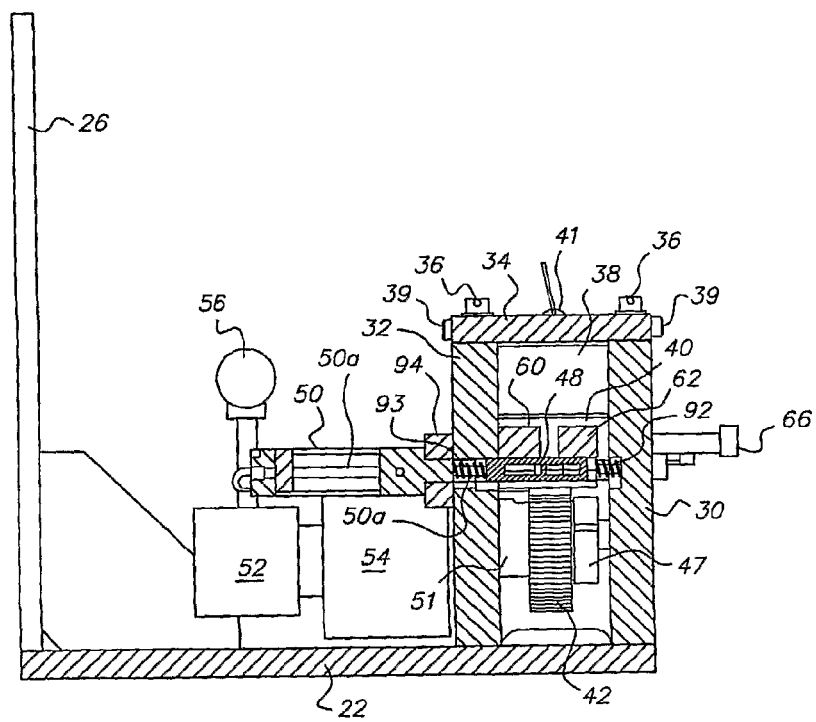
FIG. 7 is a sectional view of the apparatus shown in FIG. 5, the view being taken along the line 7-7 in FIG. 4.
Figure 9:
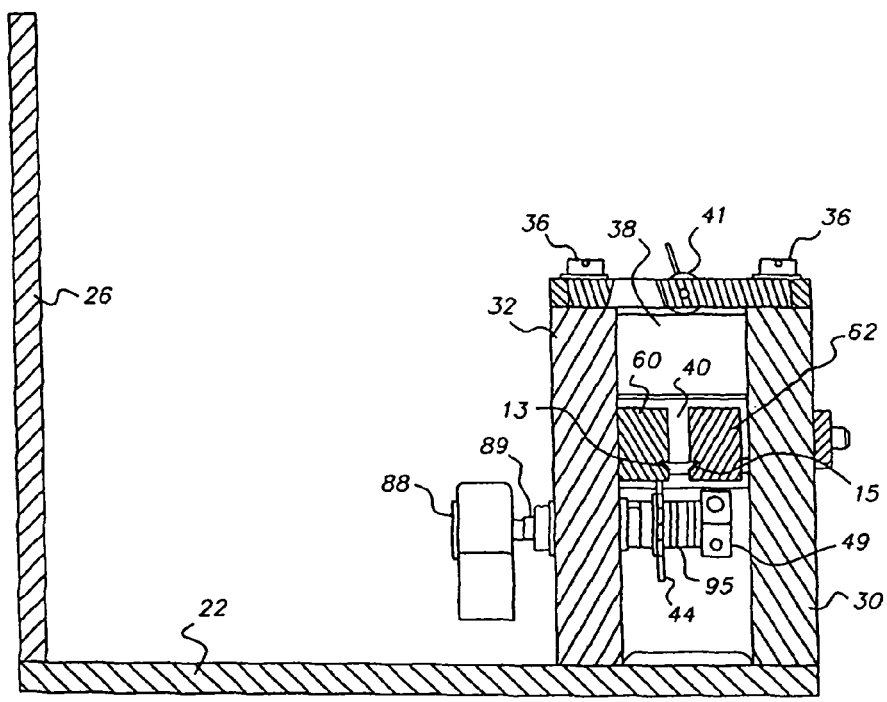
FIG. 9 is a sectional view taken along the line 9-9 in FIG. 4.

A pair of upright panels 30 and 32 provide the sides of the housing 10 and support the assembly of components which provide the mechanism of the apparatus for dual insertion of the weatherstrips. These uprights are closed by a cover 34, which may be held down by quick release nuts 36, which enable the cover to be released for easy access to the mechanism which inserts the dual weatherstrips. The cover 34 includes plate 37 pivoted on a hinge 39 (FIG. 5). The plate 37 provides pressure on rollers 38 (FIG. 13) which provide pressure on the dual weatherstrips in guides 60 and 62 (FIGS. 10-13) described more fully below. The plate 37 is releasable to rotate upwardly on its hinge 39, by a pull-out latch 41. The nuts 36 and plate 37 also hold the cover down against pressure blocks 38 which are mounted for vertical movement in slots in the uprights 30 and 32, as shown in FIG. 7. These blocks bear on the axes of pressure rollers 40. The pressure rollers 40 press the lower edges of the backing strips of the weatherstrips 13 and 15 against the drive wheel 42 and the encoder or measurement wheel 44. The drive wheel 42 is shown in FIG. 7 and the encoder wheel 44 is shown in FIG. 9. These wheels are also shown in the assembly drawing, FIGS. 10 through 14. The drive wheel 42 and encoder wheel 44 are held on their shafts 51 and 89, respectively, by lock nuts 47 and 49, respectively. Washers 95 on shaft 89 space encoder wheel 44 from its lock nut 49.

Another principal component of the mechanism is the cutter 48 which is shown in FIGS. 7, 10A, 11 and 15. The cutter is reciprocated by a pneumatic cylinder 50. The drive wheel 42 is turned by a pneumatic motor 52 via a gear box 54 (FIG. 7). Air for the motor 52 is delivered via a valve not shown, which may be mounted on the back plate 26, and compressed air lines (also not shown). Motor air is exhausted via a muffler arrangement 56, in a manner conventional for air motors.

Figure 8:
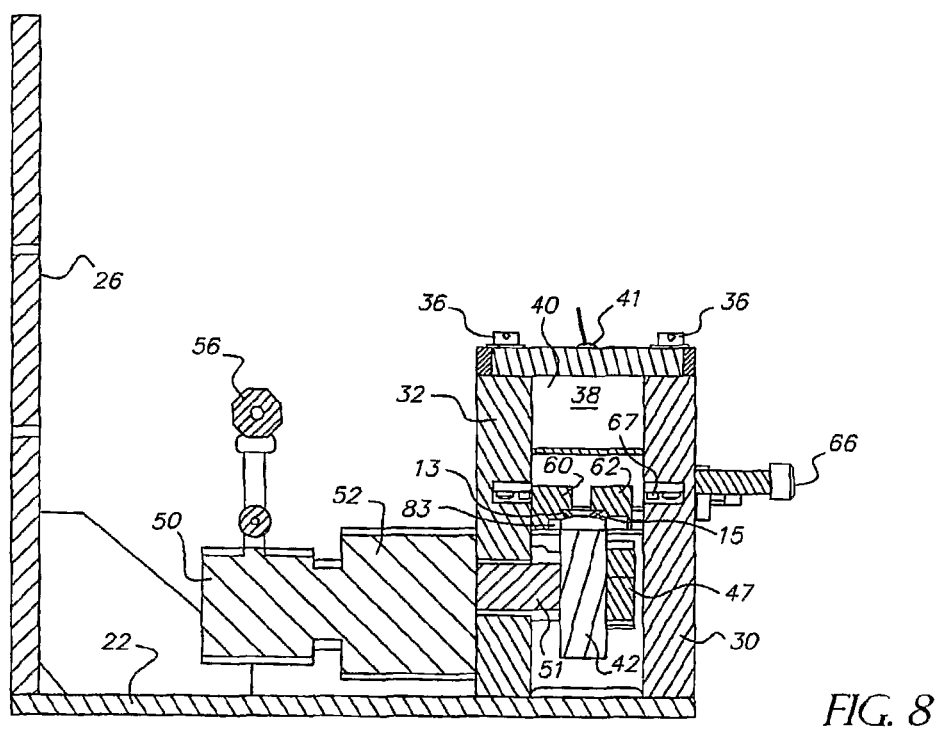
FIG. 8 is a sectional view taken along the line 8-8 in FIG. 4.

Guides 60 and 62 have T-slots through which the weatherstrips 13 and 15 travel and are guided into the corresponding slots in the extrusion 14. In order that the slots in the guides are in alignment with the slots in the extrusion 14, one of the guides 62 is laterally movable with respect to the other 60. The guide 60 is fixed to the upright 32 as shown in FIG. 8. Adjustment is obtained by an adjusting bolt 66 which is threaded into the upright 30 and bears against the outside wall of the guide 62 (see FIGS. 8 and 9) and also the assembly drawings in FIGS. 10 to 15. The guide 62 is supported on pins 70 and 72. The fixed guide 60 is attached to the upright 32 by the bolts (not shown) which extend through holes 101 and 103. The pins 70 and 72 are press fit into openings 61 in the fixed guide 60.

Figure 11:
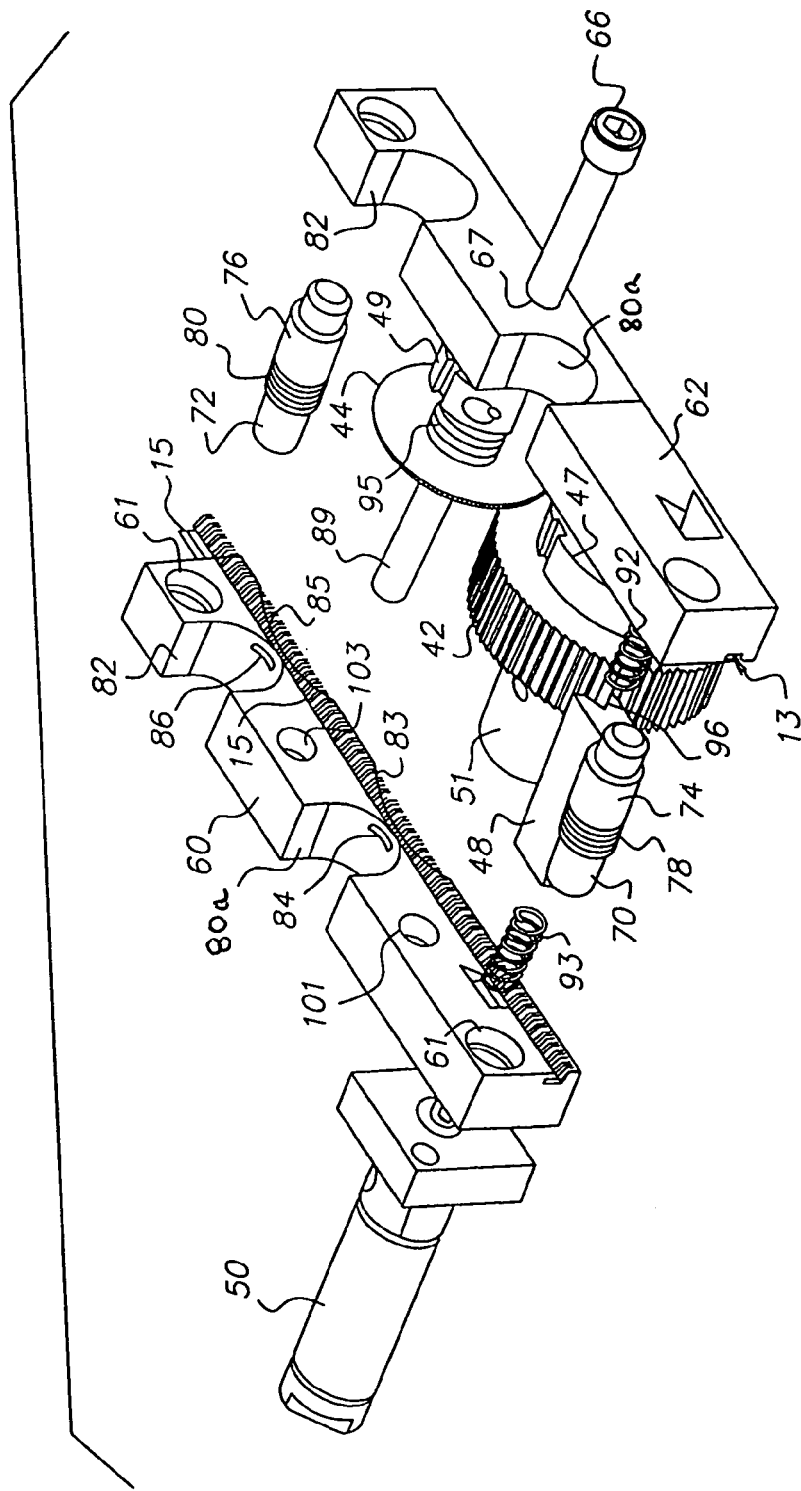
FIG. 11 is an exploded view of the assembly shown in FIG. 10A.
Figure 12:
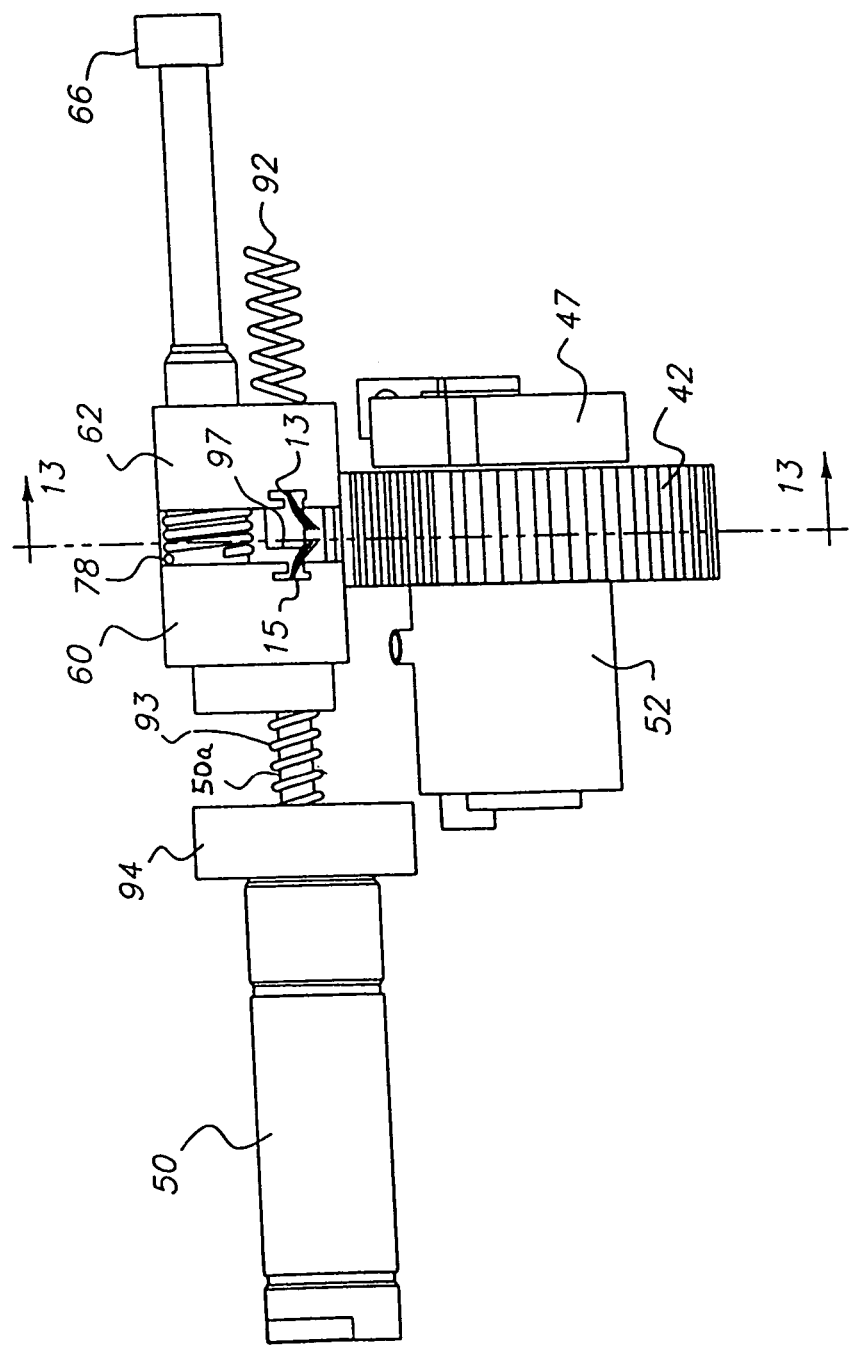
FIG. 12 is an end view taken from the left end of the assembly shown in FIG. 10.

Press fit into the other guide 62, and mounting that guide 62 for lateral movement on the pins 70 and 72 are bushings 74 and 76 (see FIG. 11). These bushings capture springs 78 and 80 between fixed guide 60 and the ends bushings 74 and 76 facing the guide 62. These springs, apply force through the bushings 74 and 76 on the laterally movable guide 62 against the end of the adjustment bolt 66. Accordingly, when the adjustment bolt 66 is turned, its end 67 (see FIGS. 8 and 10), moves the movable guide 62 on the pins 70 and 72. Since the pins are captured in the uprights 30 and 32, the guide 62 is restricted in its motion to lateral motion, and tilting or other freedoms of motions are inhibited.

As shown in FIGS. 11 and 13, the guides 60 and 62 have notches 80a and 82 and indentations 83 and 85. These notches are penetrated by slits 84 and 86. The backing strips of the weatherstrips 13 and 15 extend through these slits for engagement, along their lower edges, by the drive wheel 42. The opposite (upper) edges of the backing strips are engaged by the pressure rollers 40. The encoder wheel 44 engages the lower edge of the backing strip of the weatherstrip 13, via indentation 85, inside the fixed guide 60. Pressure rollers 40 also engage the opposite (upper edge) of the backing strip as it travels through the fixed guide 60. The drive wheel 42 is toothed, as is the encoder wheel 44, to facilitate the frictional driving engagement of these wheels and the weatherstrips. In this embodiment, both weatherstrips 13 and 15 are directly driven at the same time. The drive wheel 42 bridges the gap between the guides 60 and 62 and engages edges of the backing strips of both weatherstrips 13 and 15, via indentations 83 in guides 60 and 62 (see FIGS. 8 and 11). A drive wheel 42 may cover a range of extrusions, say over a half-inch in separation of the slots therein which receive the weatherstrips. In the event that a wider separation of slots in the extrusion is to be accommodated, the drive wheel 42 may be replaced with a drive wheel of larger width.

As the encoder wheel 44 rotates and the number of its rotations is translated into distance measurement by a commercially available shaft encoder 88 (see FIG. 9), which is connected to the encoder wheel 44 by a shaft 89. The shaft 89 penetrates the upright 32. The output of the encoder may be an electrical signal or pulse, which indicates the length of weatherstrip which is metered through the insertion apparatus. The encoder is coupled to logic circuitry having a preset desired length of weatherstrip in encoder pulses, and a counter which counts the number of encoder pulses until the desired length is reached. When requisite length is measured, the logic circuits send a signal to control valve(s) (not shown) on the back plate 26 to cause the motor 52 to stop by control of motor drive air, and to actuate the cutter 48 by applying air to the pneumatic cylinder 50 (see FIGS. 6, 7, 10, 12). The counter is then reset. The logic circuits may represent discrete logic element(s) providing a counter having an adjustable maximum value, or a microcontroller (or microprocessor or the like) programmed to provide such counter with memory storing the desired length of the weatherstrip. A user interface to the discrete logic elements or microcontroller may be provided, such as LCD display and buttons or toggle switches, to enable the user to monitor the counter value and set the desired maximum length.

The cutter 48 is a block reciprocal in the guides 60 and 62, and having two openings through which the weatherstrips 13 and 15 move. The pneumatic cylinder 50 has a piston shaft 50a (see FIG. 7 and FIG. 10A) which is connected to one end of the block of the cutter 48. A spring 93 around the shaft 50a of the piston bears against a mounting plate 94 which attaches the cylinder 50 to the upright 32. This spring 93 tends to push the cutter block 48 to the left as viewed in FIG. 15. Another spring 92, which is captured in a hole in the upright 30 (see FIG. 7), tends to move the cutter block 48 in the opposite direction. Both springs, acting together, tend to center the cutter block 48, so that windows 107 and 109 therein are aligned with the slots in the guides 60 and 62 through which the weatherstrips travel.

The weatherstrips 13 and 15 pass through these windows 107 and 109 in the laterally reciprocal cutter block 48. The windows 107 and 109 are separated by a web 97. The web 97 and the guides 60 and 62 provide the shears which cut the weatherstrips to desired lengths. The web 97 provides shearing edges 97a and 97b (FIG. 15). The inside face 96 of the cutter block 48 is v-shaped, as is the rear faces of the openings in the guides 60 and 62 in which the cutter block 48 reciprocates (see FIG. 11). Accordingly, when the pneumatic cylinder 50 is actuated and drives to the cutter to the left as viewed in FIG. 15, a shearing edge 97a at the web 97 shears the weatherstrip 13 against the inside surface of the guide 62. When the air cylinder 50 is actuated in the opposite direction, the other weatherstrip 15 is sheared by the other edge 97b of the web 97. When both sides of the piston in the air cylinder are reconnected to return pressure, the springs 92 and 93 center the cutter 48 and the cutter returns to the position shown in FIG. 15. The extrusion 14 is then removed.

Tails of the weatherstrip may extend from the extrusion. These tails may be trimmed or used for insertion in other parts of the frame of which the extrusion 14 is a part. The tails may be cut off if not needed. The darts at the end of the weatherstrips, formed by the v-shaped face 96 of the shearing edges provided by the web 97 facilitate insertion of the weatherstrips into the next extrusion in which an additional length of the weatherstrips is to be inserted.

It may be desirable to provide a fixture specific to the extrusion into which the dual weatherstrips are to be inserted, which when placed on the edge 22a of the base plate 22 aligns the weatherstrip receiving slots in the extrusion 14 with the slots in the guides 60 and 62.

From the foregoing description, it will be apparent that there has been provided an apparatus especially adapted for insertion into frames of dual weatherstrips. Variations and modifications in the herein described apparatus, within the scope of the invention, will undoubtedly suggest themselves to those skilled in the art. Accordingly, the foregoing description should be taken as illustrative and not in a limiting sense.

The invention claimed is:

1. A method for inserting a pair of weatherstrips each having a pile and a base from which the pile extends each separately into a pair of opposed slots of a fixture comprising the steps of:
   providing a pair of guide slots which are opposed to each other at least one of which is laterally movable relative to each other and in which each base of said weatherstrips is capable of traveling along one of said guide slots;
   driving simultaneously along said guide slots the base of each of the weatherstrips into the slots of the fixture with the aid of a motor driven wheel engaging the base of each of the weatherstrips; and
   cutting the weatherstrips when said weatherstrips are inserted in the fixture.

2. The method according to claim 1 further comprising using the step of relatively moving said guide slots to the slots of the fixture.

3. The method according to claim 1 further comprising carrying out said step of cutting the weatherstrips after said weatherstrips are inserted in the fixture.

\* \* \* \* \*